US010761742B1

(12) United States Patent
Neporada et al.

(10) Patent No.: US 10,761,742 B1
(45) Date of Patent: Sep. 1, 2020

(54) DYNAMIC REDUNDANCY IN STORAGE SYSTEMS

(71) Applicant: Acronis International GmBh, Shaffhausen (CH)

(72) Inventors: Andrey Neporada, Moscow Region (RU); Stanislav Protasov, Moscow (RU); Serguei M. Beloussov, Costa Del Sol (SG)

(73) Assignee: ACRONIS INTERNATIONAL GMBH, Shaffhausen (CH)

(*) Notice: Subject to any disclaimer, the term of this patent is extended or adjusted under 35 U.S.C. 154(b) by 958 days.

(21) Appl. No.: 15/195,365

(22) Filed: Jun. 28, 2016

Related U.S. Application Data

(60) Provisional application No. 62/190,427, filed on Jul. 9, 2015.

(51) Int. Cl.
*G06F 3/06* (2006.01)

(52) U.S. Cl.
CPC ............ *G06F 3/0619* (2013.01); *G06F 3/065* (2013.01); *G06F 3/067* (2013.01); *G06F 3/0647* (2013.01)

(58) Field of Classification Search
CPC combination set(s) only.
See application file for complete search history.

(56) References Cited

U.S. PATENT DOCUMENTS

| 5,734,826 | A  | * | 3/1998  | Olnowich ......... G06F 13/4022 370/410 |
| 5,737,741 | A  | * | 4/1998  | Hilditch ............. G06F 11/1076 711/114 |
| 7,047,380 | B2 |   | 5/2006  | Tormasov et al. |
| 7,246,211 | B1 |   | 7/2007  | Beloussov et al. |
| 7,275,139 | B1 |   | 9/2007  | Tormasov et al. |
| 7,281,104 | B1 |   | 10/2007 | Tsypliaev et al. |
| 7,318,135 | B1 |   | 1/2008  | Tormasov et al. |
| 7,353,355 | B1 |   | 4/2008  | Tormasov et al. |
| 7,366,859 | B2 |   | 4/2008  | Per et al. |
| 7,475,282 | B2 |   | 1/2009  | Tormasov et al. |
| 7,603,533 | B1 |   | 10/2009 | Tsypliaev et al. |
| 7,636,824 | B1 |   | 12/2009 | Tormasov |
| 7,650,473 | B1 |   | 1/2010  | Tormasov et al. |
| 7,721,138 | B1 |   | 5/2010  | Lyadvinsky et al. |
| 7,779,221 | B1 |   | 8/2010  | Tormasov et al. |
| 7,831,789 | B1 |   | 11/2010 | Tsypliaev et al. |
| 7,886,120 | B1 |   | 2/2011  | Tormasov |
| 7,895,403 | B1 |   | 2/2011  | Tormasov et al. |
| 7,934,064 | B1 |   | 4/2011  | Per et al. |

(Continued)

*Primary Examiner* — Yaima Rigol
(74) *Attorney, Agent, or Firm* — K&L Gates LLP (57) ABSTRACT

A method and system for dynamic redundancy in storage systems is described. The method may include receiving a data fragment from a data stream of user data to be archived. The method may further include splitting the data fragment into a first number of data chunks. The method may also include, in response to determining that the data fragment is not a last data fragment in the data stream, generating a second number of additional data chunks based upon, at least in part, the first number of data chunks. The method may additionally include, in response to determining that the data fragment is the last data fragment in the data stream, generating a third number of additional data chunks based upon, at least in part, the first number of data chunks.

20 Claims, 4 Drawing Sheets

(56) References Cited

U.S. PATENT DOCUMENTS

| | | |
|---|---|---|
| 7,937,612 B1 | 5/2011 | Tormasov et al. |
| 7,941,727 B2 * | 5/2011 | Greenlaw ......... H03M 13/6508 |
| | | 714/752 |
| 7,949,635 B1 | 5/2011 | Korshunov et al. |
| 7,953,948 B1 | 5/2011 | Dyatlov et al. |
| 7,979,690 B1 | 7/2011 | Dyatlov et al. |
| 8,005,797 B1 | 8/2011 | Chepel et al. |
| 8,051,044 B1 | 11/2011 | Dyatlov et al. |
| 8,069,320 B1 | 11/2011 | Per et al. |
| 8,073,815 B1 | 12/2011 | Korshunov et al. |
| 8,074,035 B1 | 12/2011 | Per et al. |
| 8,145,607 B1 | 3/2012 | Korshunov et al. |
| 8,180,984 B1 | 5/2012 | Per et al. |
| 8,225,133 B1 | 7/2012 | Tormasov et al. |
| 8,261,035 B1 | 9/2012 | Tormasov et al. |
| 8,296,264 B1 | 10/2012 | Dyatlov et al. |
| 8,312,259 B1 | 11/2012 | Dyatlov et al. |
| 8,347,137 B1 | 1/2013 | Chepel et al. |
| 8,484,427 B1 | 7/2013 | Lyadvinsky et al. |
| 8,645,748 B1 | 2/2014 | Chepel et al. |
| 8,732,121 B1 | 5/2014 | Zorin et al. |
| 8,856,927 B1 | 10/2014 | Beloussov et al. |
| 8,996,830 B1 | 3/2015 | Lyadvinsky et al. |
| 9,521,198 B1 * | 12/2016 | Agarwala ............ G06F 12/0253 |
| 2003/0101339 A1 * | 5/2003 | Bianchini ............ G06Q 20/382 |
| | | 713/153 |
| 2004/0025105 A1 * | 2/2004 | Doubler .............. H03M 13/091 |
| | | 714/781 |
| 2005/0204263 A1 * | 9/2005 | Ricci ................... H03M 13/091 |
| | | 714/758 |
| 2006/0225065 A1 | 10/2006 | Chandhok et al. |
| 2008/0133561 A1 * | 6/2008 | Dubnicki ............ G06F 11/1453 |
| 2010/0011178 A1 | 1/2010 | Feathergill |
| 2012/0060072 A1 * | 3/2012 | Simitci ............... H03M 13/373 |
| | | 714/756 |
| 2012/0210195 A1 * | 8/2012 | Dui ................... H03M 13/3761 |
| | | 714/776 |
| 2015/0067334 A1 * | 3/2015 | Syrgabekov ........ H04L 67/1097 |
| | | 713/171 |
| 2015/0067819 A1 * | 3/2015 | Shribman ............... H04L 67/06 |
| | | 726/12 |

\* cited by examiner

DYNAMIC REDUNDANCY IN STORAGE SYSTEMS

CROSS-REFERENCE TO RELATED APPLICATIONS

This application claims priority to and the benefit of U.S. Provisional Patent Application No. 62/190,427 filed on Jul. 9, 2015, the disclosure of which is herein incorporated by reference in its entirety.

TECHNICAL FIELD

The technical field may generally relate to data backup and more particularly to redundancy in data backup.

BACKGROUND

Fault tolerant storage systems may split a data fragment into data chunks. The system may also generate a number of additional chunks on the basis of the data chunks. The data chunks and additional chunks may be stored on a number of servers. The number of servers may equal the number of data chunks plus the number of additional chunks. The data fragment may be considered saved when the servers confirm that each data chunk and each additional chunk was successfully saved. This process may be known as archiving and may take a very long time. For example, if one of the servers is slow or unavailable at a particular time, it may take a long time for that server to confirm that a chunk was successfully saved, and the archiving process may ultimately fail.

The present application addresses this need and others.

BRIEF SUMMARY

In an embodiment, a method for dynamic redundancy in storage systems may include receiving a data fragment from a data stream of user data to be archived. The method may further include splitting the data fragment into a first number of data chunks. The method may also include, in response to determining that the data fragment is not a last data fragment in the data stream, generating a second number of additional data chunks based upon, at least in part, the first number of data chunks. The method may additionally include, in response to determining that the data fragment is the last data fragment in the data stream, generating a third number of additional data chunks based upon, at least in part, the first number of data chunks. The third number of additional data chunks may be greater than the second number of additional data chunks.

One or more of the following features may be included. The method may include transmitting the first number of data chunks and the third number of additional data chunks to a fourth number of storage devices. The fourth number of storage devices may be equal to the first number plus the third number. The method may further include receiving confirmation from a fifth number of storage devices that the transmitted data chunks were stored. The fifth number may be less than the fourth number. The fifth number of storage devices may be sufficient to store the data fragment with a required level of redundancy.

The method may also include, in response to receiving confirmation from the fifth number of storage devices that the transmitted data chunks were stored, confirming that the data fragment was stored with the required level of redundancy without receiving confirmation from each of the fourth number of storage devices that the transmitted data chunks were stored. The storage devices from the fourth number of storage devices that are not from the fifth number of storage devices may be the slowest storage devices to which data chunks were transmitted. The method may additionally include, in response to determining that the data fragment that was determined to be the last data fragment in the data stream is no longer the last data fragment in the data stream, deleting data chunks from the third number of additional data chunks which are not from the second number of additional data chunks.

In one embodiment of the method, a front end server receives the data fragment and the method further comprises using erasure codes to generate one or both of the second number of additional data chunks and the third number of additional data chunks. In one embodiment, the method includes storing one or more of the first number of additional data chunks, the second number of additional data chunks and the third number of additional data chunks in an append-only electronic memory storage.

In an embodiment, a system for dynamic redundancy in storage systems may include a data fragment from a data stream of user data to be archived. The system may further include a first number of data chunks split from the data fragment. The system may also include a second number of additional data chunks generated based upon, at least in part, the first number of data chunks and associated with a data fragment that is not last in the data stream. The system may additionally include a third number of additional data chunks generated based upon, at least in part, the first number of data chunks and associated with a data fragment that is last in the data stream. The third number of additional data chunks may be greater than the second number of additional data chunks.

One or more of the following features may be included. The system may transmit the first number of data chunks and the third number of additional data chunks to a fourth number of storage devices. The fourth number of storage devices may be equal to the first number plus the third number. The system may receive confirmation from a fifth number of storage devices that the transmitted data chunks were stored. The fifth number may be less than the fourth number. The fifth number of storage devices may be sufficient to store the data fragment with a required level of redundancy. In response to receiving confirmation from the fifth number of storage devices that the transmitted data chunks were stored, the system may confirm that the data fragment was stored with the required level of redundancy without receiving confirmation from each of the fourth number of storage devices that the transmitted data chunks were stored.

The storage devices from the fourth number of storage devices that are not from the fifth number of storage devices may be the slowest storage devices to which data chunks were transmitted. In response to determining that the data fragment that was determined to be the last data fragment in the data stream is no longer the last data fragment in the data stream, the system may delete data chunks from the third number of additional data chunks which are not from the second number of additional data chunks.

In one embodiment, the system further includes an archive managing server executing one or more server-side dynamic redundancy applications and one or more electronic memory storages in communication with the archive managing server, wherein one or more of the first number of additional data chunks, the second number of additional data chunks and the third number of additional data chunks are stored in the one or more electronic memory storages. In one embodiment, the one more of the one or more electronic memory storages are an append-only electronic memory storage. In one embodiment, the system further includes erasure codes to generate one or both of the second number of additional data chunks and the third number of additional data chunks. In one embodiment, one or more of the append only memory storages are connected to the archive managing server.

The details of one or more implementations are set forth in the accompanying drawings and the description below. Other features and advantages will become apparent from the description, the drawings, and the claims.

DETAILED DESCRIPTION

Overview

In part, the disclosure relates to methods and systems for providing improvements in data storage by increasing redundancy when storing information. In this way existing computer data storage and recovery processes can be improved. In particular, when storing the last fragment of file, sometimes referred to as a file tail, increasing the level of file storage redundancy has certain advantages. The advantages typically include increased service availability with regard to services that involve file changes or additions.

Specifically, a given implementation of the systems and methods described herein can increase service availability relating to file appends and other file changes without significantly increasing the amount of extra memory storage. This can be achieved by selectively storing parts of the file. For example, in one embodiment only the last fragments of one or more files are stored with greater redundancy. The processes and systems can be implemented with regard to cloud computing, software as a service, and other computing environments to improve backup and recovery of data files.

A cloud provider or system administrator may institute backup and recovery or other procedures to ensure persistence and/or security of applications, data, or other resources accessed through one or more physical or virtual machines. Fault tolerant storage systems may be used to ensure data availability in the event of storage device failure or other system issues.

A storage system may include a number of storage servers or a set of disks (e. g. HDDs or hard disk drives). The storage system may be managed with software for archiving and storing data. User data, which may be stored on the storage system, may include any digital information stored by a user (e.g., files, software, data bases etc.). A data archive may be a file format used to store user data on the storage system. Further, a data stream may be a continuous stream of user data set to be archived.

The storage system may include a front end server (FES). The FES may be a managing server such as an archive managing server which may control an archiving process. An append-only storage system may be a storage system in which any data to be archived is placed at the end of an archive file. In general, the data may not be deleted or rewritten. A data fragment may be a fixed-size portion of data from the data stream. Further, a chunk may be a piece of data which produced from the data fragment by splitting the data fragment. Additionally, the chunk may be generated using an algorithm. A data fragment may be split into several chunks for fault tolerant storage.

For example, fault tolerant storage systems may split and/or process a data fragment to be stored or archived into K+M chunks. K may be the number of data chunks split from the data fragment and M may be the number of chunks generated on the basis of the data chunks. To generate the M chunks, erasure codes may be used. Erasure coding may refer to a process of data protection where data may be broken up into chunks. Further, the data may be expanded and/or encoded. The data chunks may be reassembled to rebuild files if the data is lost (e.g., due to failed storage devices or other storage system issues).

For example, Reed-Solomon codes may be used. Reed-Solomon codes may be error-correcting techniques which may allow for twice the copies of data to be stored, but without using twice the storage space. This type of coding may be used in fault-tolerant systems (e.g., CDs, RAID-6 arrays etc.). These codes are intended to require less storage (e.g., disks) than using duplication. For example, a RAID-1 array may use two disks and write data to both disks, so for 1 GB data, 2 GB storage space may be necessary. Using erasure coding such as Reed-Solomon codes, the spare copy of data may be calculated rather than just duplicated. For example, 1 GB data may be redundantly stored with 1.4 GB of storage space where, for example, a 5+2 scheme is used. These codes may allow a system to avoid primitive data duplication, but provide a reliable mechanism to help restore all user data, even if some devices (e.g., disks or servers) were damaged.

For example, in some systems, to restore K data chunks, K+M chunks should be restored. This is because if any of the M generated chunks are lost, all of the original data may be restored with the remaining K chunks. In other words, in some systems, whether the chunks are data chunks (K) or generated chunks (M) may not matter. For example, when archiving data, the K+M chunks may be stored on N servers (or disks), where K+M=N. The original data may be considered to be saved if each of the N servers confirms that each of the N number of chunks (K+M) are successfully recorded to storage.

In some situations, the archiving process may take a long time if one or more storage servers are slow or unavailable. For example, if the storage system is designed to wait for each of the N number of servers to confirm that each of the K+M chunks has been stored, the archiving process may fail, even if only one of N servers does not confirm data integrity. In some situations, the slowest servers may bog down the storage system in this manner, and may ultimately slow a backup or archiving operation down.

In view of the forgoing, there may be a need for a storage system which does not require each server to confirm that each chunk has been stored, which can avoid the slowest servers, or which can decrease the time required for a backup or archiving operation. The techniques and features described in the present disclosure may improve backup or archiving operation speeds by, for example, avoiding waiting for confirmation from all storage system servers to ensure successful backup or avoiding waiting for confirmation from the slowest storage system servers.

Figure 1:
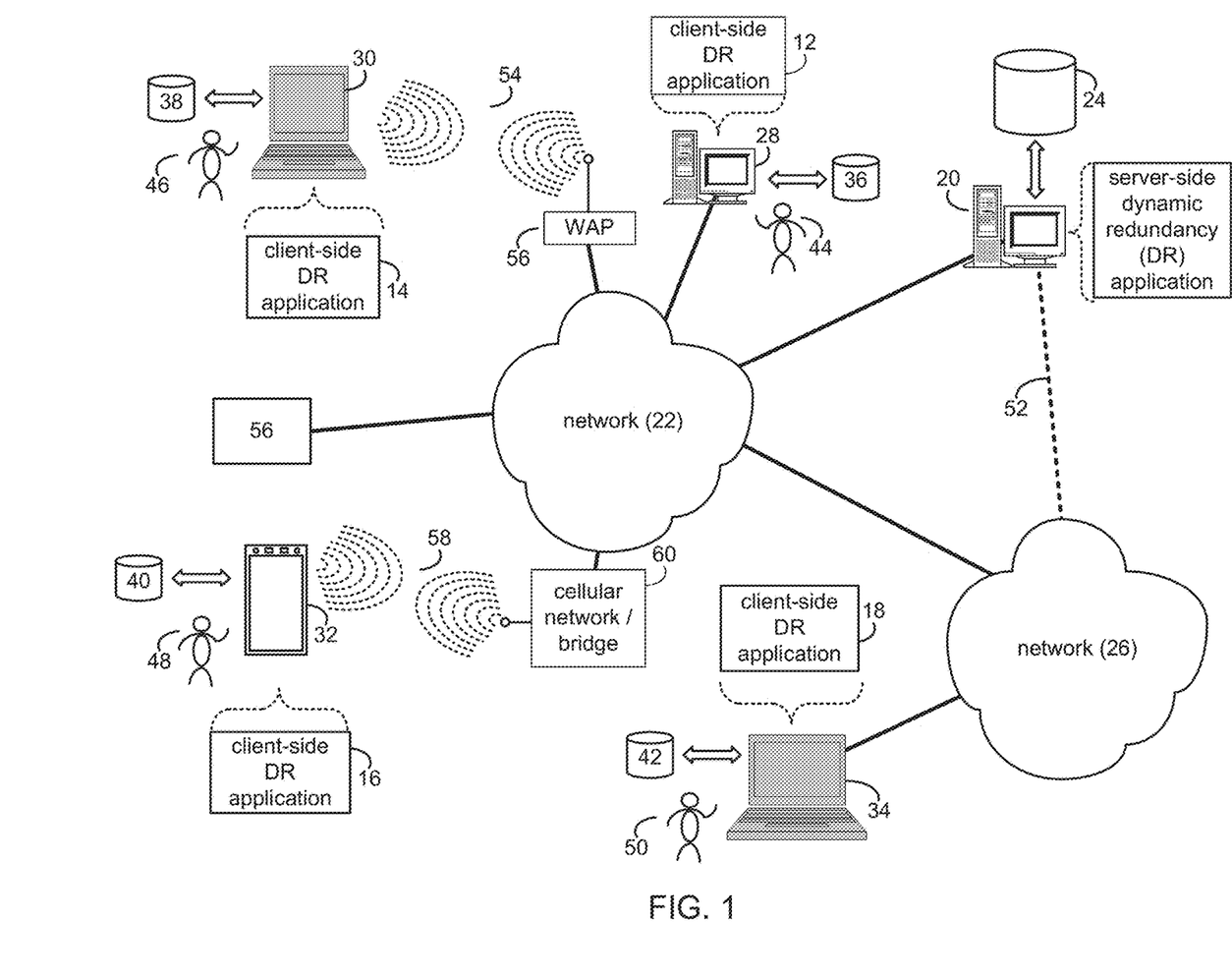
FIG. 1 depicts an example system that can execute implementations of the present disclosure.

Referring to FIG. 1, there is shown a server-side dynamic redundancy (DR) application 10 and client-side DR applications 12, 14, 16, and 18. Server application 10 and/or one or more of client applications 12, 14, 16, and/or 18 may execute one or more processes configured to carry out one or more of the features described herein. Server application 10 may be referred to as a process configured to carry out one or more of the features described herein, such as DR process 10. Further, one or more of client applications 12, 14, 16, and 18 may be referred to as a process configured to carry out one or more of the features described herein, such as DR processes 12, 14, 16, and/or 18.

As will be discussed below and referring now to FIG. 4, DR process or application 10, 12, 14, 16, or 18 may receive 300 a data fragment from a data stream of user data to be archived. DR process 10, 12, 14, 16, or 18 may also split 302 the data fragment into a first number of data chunks. DR process 10, 12, 14, 16, or 18 may further, in response to determining that the data fragment is not a last data fragment in the data stream, generate 304 a second number of additional data chunks based upon, at least in part, the first number of data chunks. DR process 10, 12, 14, 16, or 18 may also, in response to determining that the data fragment is the last data fragment in the data stream, generate 306 a third number of additional data chunks based upon, at least in part, the first number of data chunks. The third number of additional data chunks may be greater than the second number of additional data chunks.

The DR process may be a server-side process (e.g., server-side DR process 10), a client-side process (e.g., client-side DR process 12, client-side DR process 14, client-side DR process 16, or client-side DR process 18), or a hybrid server-side/client-side process (e.g., a combination of server-side DR process 10 and one or more of client-side DR processes 12, 14, 16, 18).

System Overview

Figure 2:
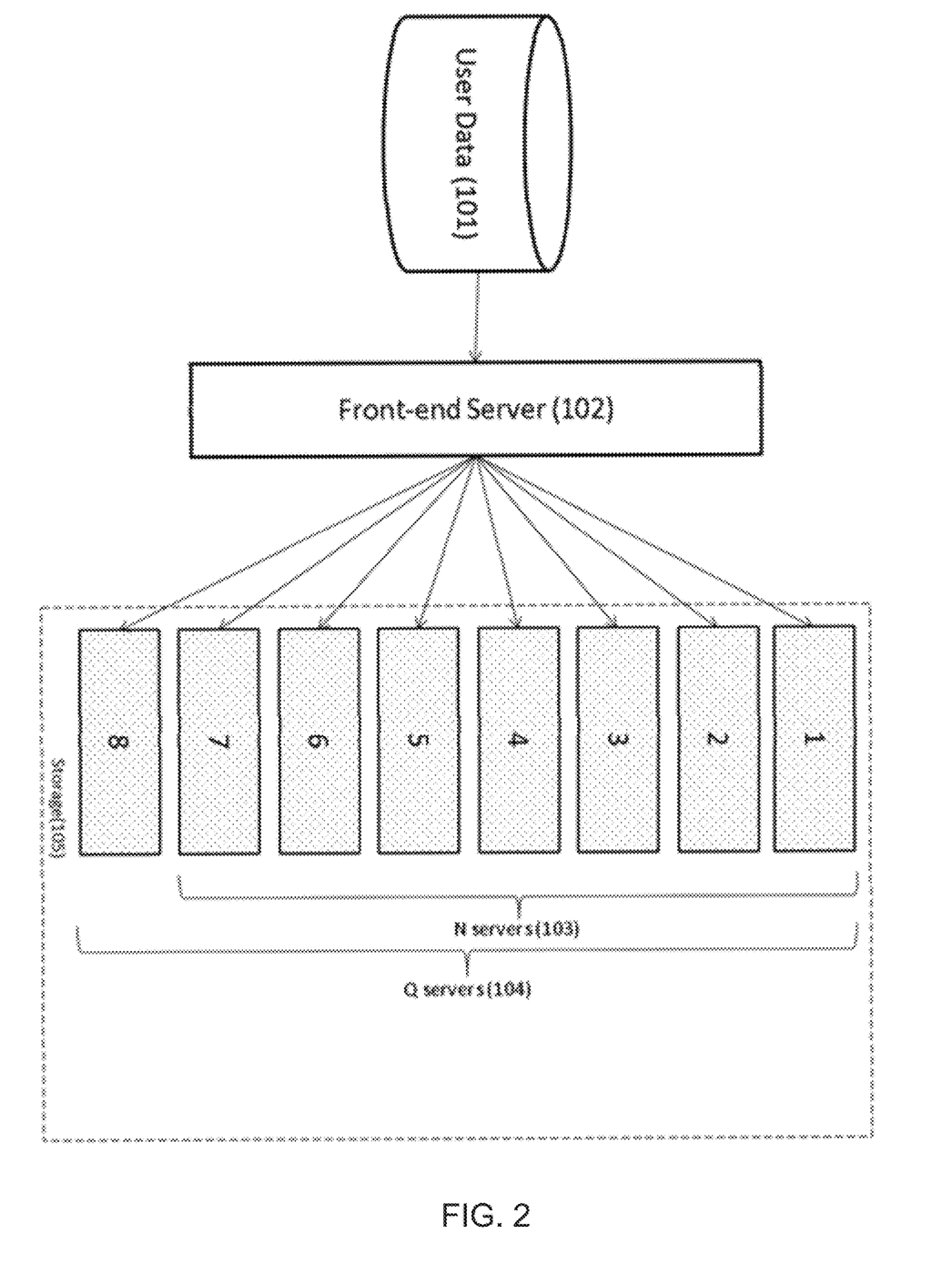
FIG. 2 is a diagrammatic flowchart illustrating an example architecture in accordance with implementations of the present disclosure.

Referring to FIG. 1, server-side DR process 10 may reside on and may be executed by server computer 20 (e.g., in an embodiment, front-end server 102 as shown in FIG. 2), which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially.

For example, server computer 20 may be a symbolic representation of a cloud computing site, cloud environment, or cloud platform running multiple servers, computers, or virtual machines (e.g., a virtual machine host computer). Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side DR process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a solid state storage device; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side DR processes 12, 14, 16, 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side DR processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; solid state storage devices; RAID arrays; random access memories (RAM); read-only memories (ROM); compact flash (CF) storage devices; secure digital (SD) storage devices; and memory stick storage devices.

Client-side DR processes 12, 14, 16, 18 and/or server-side DR process 10 may be processes that run within (i.e., are part of) a cloud computing site, cloud computing application, cloud platform, or cloud environment. Alternatively, client-side DR processes 12, 14, 16, 18 and/or server-side DR process 10 may be stand-alone applications that work in conjunction with the cloud computing site, cloud computing application, cloud platform, or cloud environment. One or more of client-side DR processes 12, 14, 16, 18 and server-side DR process 10 may interface with each other (via network 22 and/or network 26).

Users 44, 46, 48, 50 may access server-side DR process 10 directly through the device on which the client-side DR process (e.g., client-side DR processes 12, 14, 16, 18) is executed, namely client electronic devices 28, 30, 32, 34, for example. Users 44, 46, 48, 50 may access server-side DR process 10 directly through network 22 and/or through secondary network 26. Further, server computer 20 (i.e., the computer that executes server-side DR process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

DR Process

For the following discussion, server-side DR process 10 will be described for illustrative purposes and server computer 20 may run server-side DR application 10 to carry out some or all of the techniques and features described here. It should be noted that server-side DR process 10 may interact with client-side DR process 12 and may be executed within one or more applications that allow for communication with client-side DR process 12. However, this is not intended to be a limitation of this disclosure, as other configurations are possible (e.g., stand-alone, client-side DR processes and/or stand-alone server-side DR processes). For example, some implementations may include one or more of client-side DR processes 12, 14, 16, and 18 in place of or in addition to server-side DR process 10.

The systems and methods (e.g., DR process 10) described herein relate to physical or virtual machine backups, archives, data, files, and/or folders. In part, the systems and methods relate to improving backup or archiving operation speeds. The systems described herein may include one or more memory elements for backup of software, databases, user data, and physical or virtual machines.

Referring now to FIG. 1, one or more of users 44, 46, 48, and 50 may be cloud administrators or system administrators or may be cloud or system end-users. The cloud or system administrators may access and/or administer server computer 20 or client electronic devices 28, 30, 32, 34 (respectively). In an embodiment one or more of server computer 20 or client electronic devices 28, 30, 32, 34 may be a physical computer system, virtualization host device, or cloud computing client. The virtualization host device may include a virtual machine and may run a cloud or virtualization application such as VMWare™ or may include a bare-metal embedded hypervisor (e.g. VMware™ ESX™ and VMware™ ESXi™).

Further, the virtualization host device may include a vCloud™ architecture that may enhance cooperation between hypervisors. DR processes 10, 12, 14, 16, and/or 18 may include or may work in connection with an agent (e.g., a software module), which may include or may be configured to perform any number of the techniques or features described herein.

DR processes 10, 12, 14, 16, and/or 18 may include a software component, executable code, function, subroutine, or other set of instructions designed to carry out one or more operations for dynamic redundancy in storage systems. The techniques, features, and/or operations described herein may improve backup or archiving operation speeds. For example, the techniques, features, and/or operations described herein may backup or archiving operation speeds by avoiding waiting for confirmation from all storage system servers to ensure successful backup/archive or avoiding waiting for confirmation from the slowest storage system servers.

For example, the techniques, features, and/or operations described herein may improve backup or archiving operation speeds by storing file tails (i.e. the last fragment of file) with increased redundancy. This may greatly increase service availability (file appends) without using much extra space because only the last fragments may be stored with greater redundancy.

In an embodiment, append-only storage (or an append-only file system) may be used and may be different from a read-write storage or file system. For example, append-only storage may work efficiently for linear storage systems such as tape drives, CD/DVD disks, which may not be rewritable. With this type of storage, previously stored information or records may not be deleted, but new information or records may be added to the end of archive. Append-only storage may be beneficial for backup archives or cold data. Append-only storage may be implemented with other types of hardware (e.g., hard disks and/or disk arrays).

In one embodiment, append-only storage may be useful when it is not necessary to read/write data regularly, but data archiving is desired. Further, append-only storage may help reduce the number of errors during data archiving. Append-only storage may also work faster for archiving purposes because it is always known where new data is to be written and random read/write operations into different sectors of a hard disk may be avoided.

In an embodiment, a storage system may operate in an append-only mode. The system may dynamically add redundant information for all data fragments which are added to the end of an archive file. More chunks for data fragments which are the latest to be added to the archive may be generated. For example, instead of sending K (data chunks)+M (generated chunks)=N chunks to N servers on the storage system, the system may generate M' generated chunks and send K (data chunks)+M' (generated chunks)=Q chunks to Q servers on the storage system, where Q>N, and M'>M. Thus, when N servers of the Q servers confirm that the chunk was stored successfully, the storage system can confirm that the data fragment archived was saved with a level of redundancy required for confirmation.

As a result, the storage system need do not wait for a storage confirmation from each of the Q servers, as storage confirmation from only N number servers may be enough to show a level of redundancy required. Accordingly, the storage system may avoid waiting for confirmation from slowest servers of the storage system and may perform an archiving operation as quickly as possible. Because the storage system may archive data on an append-only basis, this storage operation may be performed for the last data fragment added to the archive only, and thus the redundancy level may be minimized.

Figure 3:
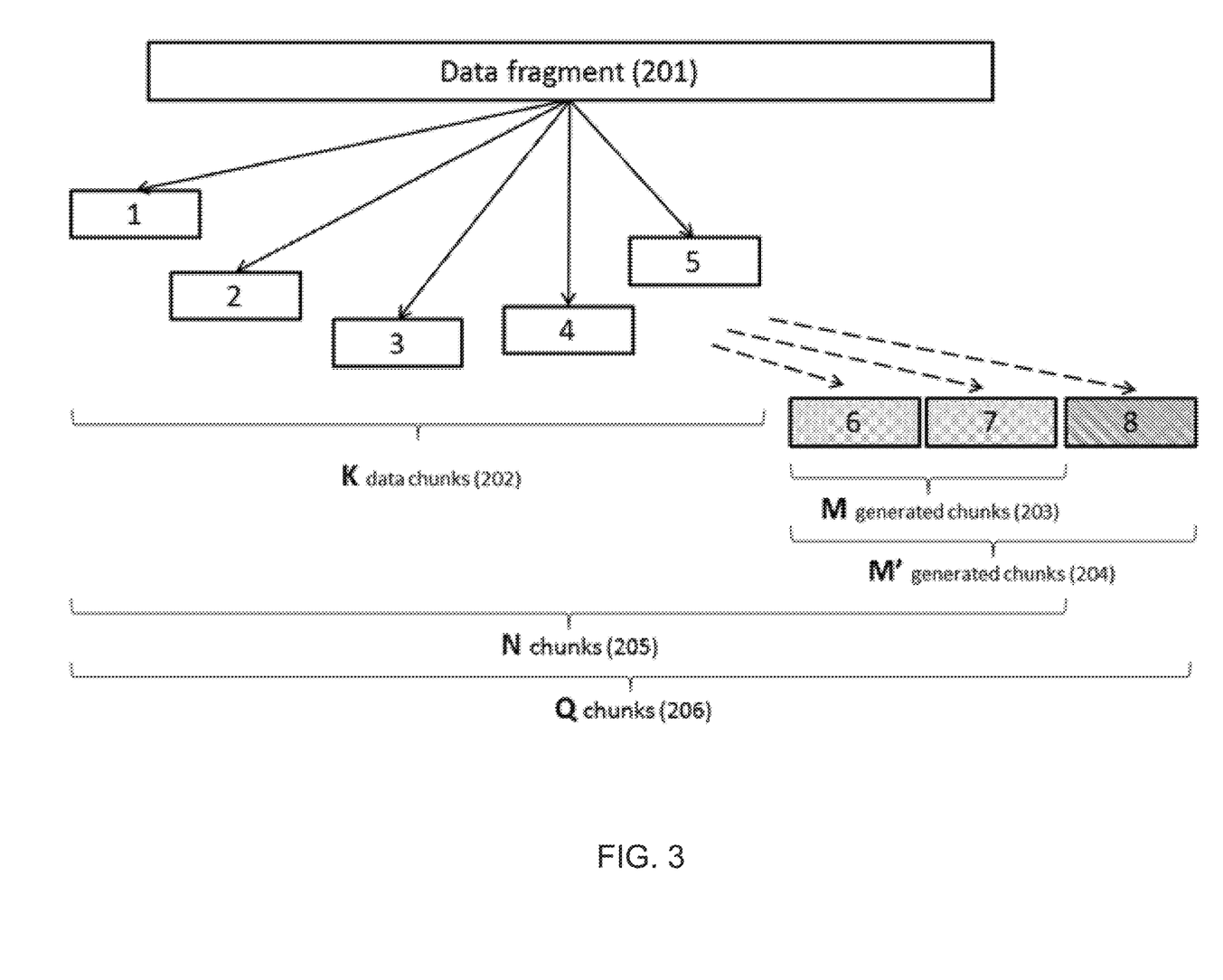
FIG. 3 is a diagrammatic flowchart illustrating an example data fragment in a process for dynamic redundancy in storage systems in accordance with the present disclosure.
Figure 4:
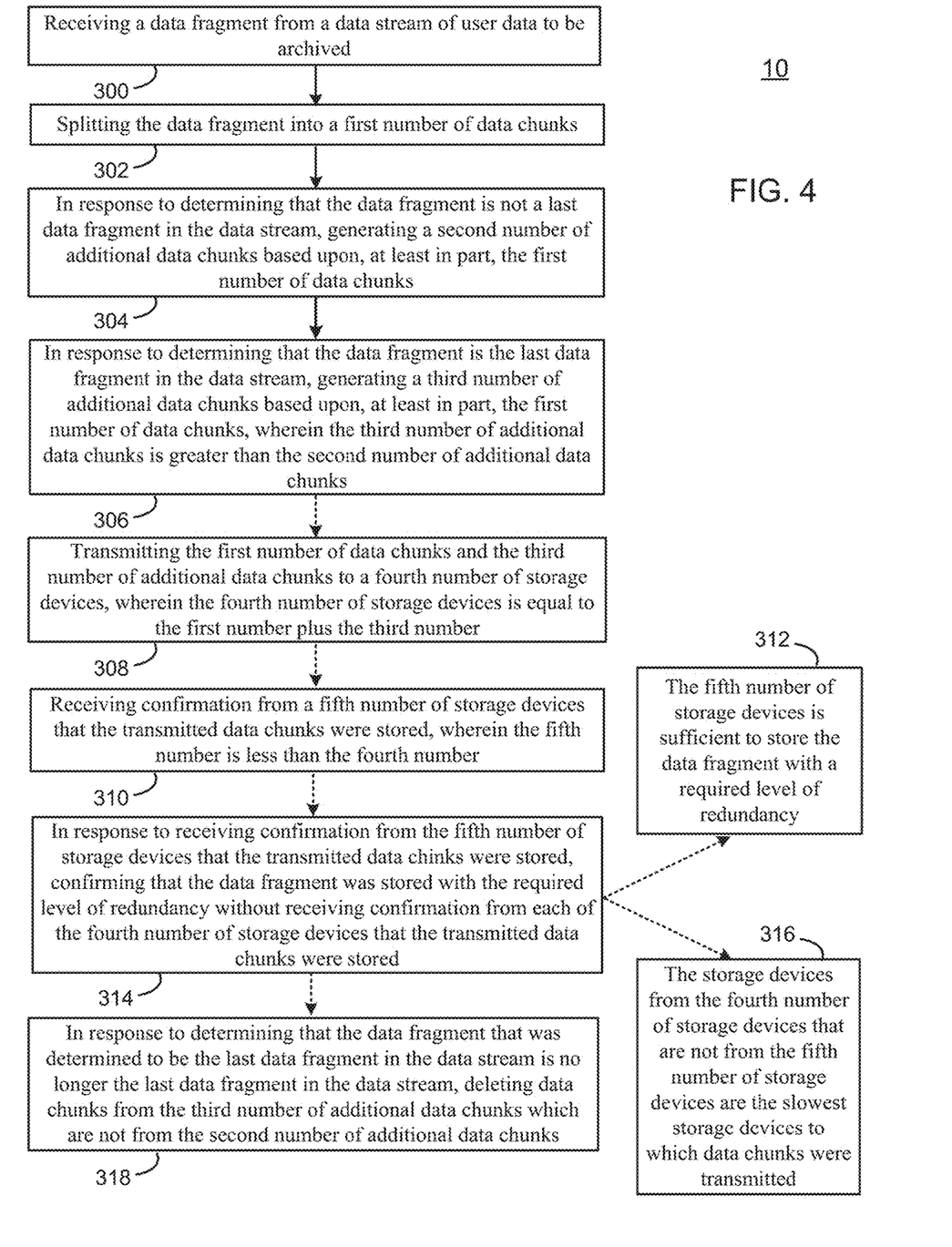
FIG. 4 is also flowchart illustrating an example process for dynamic redundancy in storage systems in accordance with the present disclosure.

For example, and referring now to FIG. 4, in an embodiment, DR process 10 may receive 300 a data fragment from a data stream of user data to be archived. Referring now also to FIG. 3, the data fragment may be data fragment 201. The data stream may be any type of user data and may be, for example, user data 101 as shown in FIG. 2. In an implementation, user data 101 may be received at front-end server 102. For example, data fragment 201 may be received from one or more client devices such as one or more of client electronic devices 28, 20, 32, and/or 34.

In addition, front-end server 102 (e.g., server computer 20) may receive multiple data fragments from one or more client devices (e.g., client electronic devices 28, 20, 32, and/or 34) and may, in some implementations, perform DR process 10 on each data fragment received. For example, in an implementation, each data fragment received may be added to an archive using the techniques and features described here.

Further, DR process 10 may split 302 the data fragment (e.g., data fragment 201) into a first number of data chunks. The data chunks may be represented, for example, by K, such as K data chunks 202 as shown in FIG. 3. As shown in FIG. 3 for illustrative purposes only, data fragment 201 may be split into five data chunks 202 where K=5. DR process 10 may also, in response to determining that the data fragment (e.g., data fragment 201) is not a last data fragment in the data stream, generate 304 a second number of additional data chunks based upon, at least in part, the first number of data chunks. For example, as shown in FIG. 3, DR process 10 may generate M additional data chunks 203 based upon K data chunks 202. As discussed above, the additional data chunks may be generated using erasure codes such as, for example, Reed-Solomon codes. As shown in FIG. 3 for illustrative purposes only, two additional data chunks 203 may be generated based on K data chunks 202, where M=2.

In an embodiment, DR process 10 may determine if the data fragment (e.g., data fragment 201) is or is not a last data fragment in the data stream based upon the size of the data fragment, file size, and/or offset.

DR process 10 may, in response to determining that the data fragment (e.g., data fragment 201) is the last data fragment in the data stream, generate 306 a third number of additional data chunks based upon, at least in part, the first number of data chunks. For example, as shown in FIG. 3, DR process 10 may generate M' additional data chunks 204 based upon K data chunks 202. As shown in FIG. 3 for illustrative purposes only, three additional data chunks 204 may be generated based on K data chunks 202, where M'=3. The third number of additional data chunks (e.g., M' additional data chunks 204) may be greater than the second number of additional data chunks (e.g., M additional data chunks 203). For example, as shown in FIG. 3, M' may be three and M may be two (i.e., M'=3 and M=2).

Accordingly, in an implementation, K (e.g., data chunks 202)+M (e.g., additional/generated data chunks 203)=N chunks for a data fragment which is not the last data fragment in the data stream. Additionally, in an implementation, K (e.g., data chunks 202)+M' (e.g., additional/generated data chunks 204)=Q chunks for a data fragment which is the last data fragment in the data stream. In various implementations, DR process 10 may send the N chunks (e.g., N chunks 205 as shown in FIG. 3) to N servers 103 (e.g., 7 servers) as shown in FIG. 2 in an archiving operation. Further in various implementations, DR process 10 may send the Q chunks (e.g., Q chunks 206 as shown in FIG. 3) to Q servers 104 (e.g., 8 servers) as shown in FIG. 2 in an archiving operation. N servers 103 and/or Q servers 104 may be part of storage 105, and may each include one or more storage devices used for backup and/or archiving purposes.

For example, in an embodiment, DR process 10 may transmit 308 the first number of data chunks (e.g., K data chunks 202) and the third number of additional data chunks (e.g., M' additional/generated data chunks 204) to a fourth number of storage devices (e.g., K+M'=Q) or servers (e.g., Q=8 servers as shown in FIG. 2). In an implementation, the fourth number of storage devices (e.g., Q=8) or servers may be equal to the first number (e.g., K=5 such as five data chunks) plus the third number (e.g., M'=3 such as three additional/generated data chunks).

DR process 10 or an administrator or the storage system may determine, for example, that only N storage devices or servers (i.e., some minimal number of storage devices or servers) are necessary to save the data fragment with sufficient redundancy, such that confirmation of successful storage from N storage devices or servers only is required to ensure sufficient redundancy. For example, depending on the task at hand, redundancy may be increased based on the criticality of the data. Thus, in an implementation, the threshold of redundancy may be determined by a user. For example, a 5+2 scheme may be used because it may provide one of the best values for reliability/redundancy.

In an implementation, DR process 10 may require confirmation from only N storage devices or servers (e.g., 7) rather than Q storage devices or servers (e.g., 8). As such, DR process 10 may wait for confirmation from the 7 storage devices or servers, and may skip waiting for the slowest server to ensure sufficient redundancy. Thus, the data fragment (e.g., data fragment 201) may be restored using K any chunks. As a result, the slowest storage devices or servers from the Q servers may be disregarded during the archiving operation.

For example, in an implementation, DR process 10 may receive 310 a confirmation from a fifth number of storage devices or servers (e.g., N storage devices or servers 103 as shown in FIG. 2) that the transmitted data chunks (e.g., K data chunks 202 and M' additional/generated data chunks 204) were stored. In other words, DR process 10 may not receive confirmation that all of the transmitted data chunks were stored successfully. In an implementation, for illustrative purposes only, DR process 10 may only receive confirmation from N=7 servers the transmitted data chunks (e.g., 7 of the 8 transmitted data chunks) were stored. Further, in an implementation, the fifth number (e.g., N chunks) may be less than the fourth number (e.g., Q chunks).

Further, DR process 10 may, in response to receiving confirmation from the fifth number of storage devices or servers (e.g., N storage devices or servers 103 as shown in FIG. 2) that the transmitted data chunks (e.g., K data chunks 202 and M' additional/generated data chunks 204) were stored, confirm 314 that the data fragment (e.g., data fragment 201) was stored with the required level of redundancy without receiving confirmation from each of the fourth number of storage devices (e.g., Q storage devices or servers 104 as shown in FIG. 2) that the transmitted data chunks (e.g., K data chunks 202 and M' additional/generated data chunks 204) were stored.

The fifth number of storage devices (e.g., N storage devices or servers 103 as shown in FIG. 2) may be sufficient (312) to store the data fragment (e.g., data fragment 201) with a required level of redundancy.

In an implementation, the storage devices or servers from the fourth number of storage devices (e.g., Q storage devices or servers 104 as shown in FIG. 2) that are not from the fifth number of storage devices (e.g., N storage devices or servers 103 as shown in FIG. 2) may be (316) the slowest storage devices or servers to which data chunks were transmitted. For example, as shown in FIG. 2, the storage device or server with reference numeral "8" may be the slowest storage device or server to which data chunks were transmitted.

Further, in an implementation, DR process 10 may, in response to determining that the data fragment (e.g., data fragment 201) that was determined to be the last data fragment in the data stream is no longer the last data fragment in the data stream, delete 318 data chunks from the third number of additional data chunks (e.g., M' additional/ generated data chunks 204) which are not from the second number of additional data chunks (e.g., M additional/generated data chunks 203). For example, as shown in FIG. 3, the data chunk with reference numeral "8" may be deleted, e.g., from the storage device or server with reference numeral "8" because sufficient redundancy was achieved without the need for this data chunk to be stored.

In this way, the techniques and features described herein may be used to obtain the minimal data redundancy required to achieve sufficient storage redundancy because append-only storage is used and new data is always added to the end of an archive. While the techniques and features described herein have been illustrated with regard to append-only storage operations, such illustration does not limit the present disclosure to append-only storage operations.

For example, the techniques and features described herein may be performed on any data fragments having a known location in a storage system. In other words, the techniques and features described herein may be performed on any type of data for which a fixed location on the storage system is known, such as, for example, tape drives or multisession CD-R/DVD-R/DVD+R, or also for program-defined storage systems which may be designed for storing cold data. Cold data an include backup archives or data that may be only access infrequently or potentially never accessed unless a need arises.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

In various embodiments, modules or software can be used to practice certain aspects of the disclosure. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the disclosure. In certain embodiments, a "module" may include software, firmware, hardware, or any reasonable combination thereof.

Various embodiments of the systems and methods may include and/or utilize a computer device. In various embodiments, a computer may be in communication with a server or server system utilizing any suitable type of communication including, for example, wired or wireless digital communications. In some embodiments, the server or server system may be implemented as a cloud computing application or in a similar manner and may provide various functionality of the systems and methods as SaaS.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers.

In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including Web Sphere Application Server. Other examples include Web Sphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java).

Also, application servers may be provided in accordance with the .NET framework, including the Windows Communication Foundation, .NET Remoting, ADO.NET, and ASP-.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention. Accordingly, other embodiments and implementations are within the scope of the following claims. For example, the actions recited in the claims can be performed in a different order and still achieve desirable results.

What is claimed is:

1. A method for dynamic redundancy in storage systems, the method comprising:
   receiving a data fragment from a data stream of user data to be archived;
   splitting the data fragment into a first number of data chunks;
   in response to determining that the data fragment is not a last data fragment in the data stream, generating a second number of redundant data chunks based upon, at least in part, the first number of data chunks; and
   in response to determining that the data fragment is the last data fragment in the data stream, generating a third number of redundant data chunks based upon, at least in part, the first number of data chunks, wherein the third number of redundant data chunks is greater than the second number of redundant data chunks.

2. The method of claim 1, further comprising:
   transmitting the first number of data chunks and the third number of redundant data chunks to a fourth number of storage devices, wherein the fourth number of storage devices is equal to the first number plus the third number.

3. The method of claim 2, further comprising:
   receiving confirmation from a fifth number of storage devices that the transmitted data chunks were stored, wherein the fifth number is less than the fourth number.

4. The method of claim 3, wherein the fifth number of storage devices is sufficient to store the data fragment with a required level of redundancy.

5. The method of claim 3, further comprising:
   in response to receiving confirmation from the fifth number of storage devices that the transmitted data chunks were stored, confirming that the data fragment was stored with a required level of redundancy without receiving confirmation from each of the fourth number of storage devices that the transmitted data chunks were stored.

6. The method of claim 3 wherein the storage devices from the fourth number of storage devices that are not from the fifth number of storage devices are the slowest storage devices to which data chunks were transmitted.

7. The method of claim 3, further comprising:
   receiving a second data fragment from the data stream of user data to be archived; and in response to determining that the data fragment that was determined to be the last data fragment in the data stream is no longer the last data fragment in the data stream, deleting data chunks from the third number of redundant data chunks which are not from the second number of redundant data chunks.

8. The method of claim 1 wherein a front end server receives the data fragment and further comprising using erasure codes to generate one or both of the second number of redundant data chunks and the third number of redundant data chunks.

9. The method of claim 8 further comprising storing one or more of the first number of data chunks, the second number of redundant data chunks and the third number of redundant data chunks in an append-only electronic memory storage.

10. A system for dynamic redundancy in storage systems, the system comprising:
- a data fragment from a data stream of user data to be archived;
- a first number of data chunks split from the data fragment;
- a second number of redundant data chunks generated based upon, at least in part, the first number of data chunks and associated with a data fragment that is not last in the data stream; and
- a third number of redundant data chunks generated based upon, at least in part, the first number of data chunks and associated with a data fragment that is last in the data stream, wherein the third number of redundant data chunks is greater than the second number of redundant data chunks.

11. The system of claim 10, wherein the system transmits the first number of data chunks and the third number of redundant data chunks to a fourth number of storage devices, wherein the fourth number of storage devices is equal to the first number plus the third number.

12. The system of claim 11, wherein the system receives confirmation from a fifth number of storage devices that the transmitted data chunks were stored, wherein the fifth number is less than the fourth number.

13. The system of claim 12, wherein the fifth number of storage devices is sufficient to store the data fragment with a required level of redundancy.

14. The system of claim 12, wherein, in response to receiving confirmation from the fifth number of storage devices that the transmitted data chinks chunks were stored, the system confirms that the data fragment was stored with a required level of redundancy without receiving confirmation from each of the fourth number of storage devices that the transmitted data chunks were stored.

15. The system of claim 12, wherein the storage devices from the fourth number of storage devices that are not from the fifth number of storage devices are the slowest storage devices to which data chunks were transmitted.

16. The system of claim 12, further comprising:
- a second data fragment from the data stream of user data to be archived;
- wherein, in response to determining that the data fragment that was determined to be the last data fragment in the data stream is no longer the last data fragment in the data stream, the system deletes data chunks from the third number of redundant data chunks which are not from the second number of redundant data chunks.

17. The system of claim 10 further comprising:
- an archive managing server executing one or more server-side dynamic redundancy applications and
- one or more electronic memory storages in communication with the archive managing server,
- wherein one or more of the first number of data chunks, the second number of redundant data chunks and the third number of redundant data chunks are stored in the one or more electronic memory storages.

18. The system of claim 17 wherein one or more of the one or more electronic memory storages are an append-only electronic memory storage.

19. The system of claim 18 further comprising erasure codes to generate one or both of the second number of redundant data chunks and the third number of redundant data chunks.

20. The system of claim 19 wherein one or more of the append-only memory storages are connected to the archive managing server.

* * * * *